United States Patent [19]
Pryor

[11] Patent Number: 6,138,055
[45] Date of Patent: Oct. 24, 2000

[54] CONTROLLED MACHINING OF COMBUSTION CHAMBERS, GEARS AND OTHER SURFACES

[75] Inventor: Timothy R. Pryor, Tecumseh, Canada

[73] Assignee: LMI Technologies Inc., Windsor, Canada

[21] Appl. No.: 08/161,304

[22] Filed: Dec. 2, 1993

Related U.S. Application Data

[63] Continuation of application No. 07/509,295, Apr. 16, 1990, Pat. No. 5,112,131, which is a continuation of application No. 07/042,527, Apr. 27, 1987, Pat. No. 5,012,574, which is a continuation of application No. 06/767,374, Aug. 20, 1985, abandoned, which is a continuation of application No. 06/560,259, Dec. 12, 1983, Pat. No. 4,559,684, which is a continuation of application No. 06/238,702, Feb. 21, 1981, abandoned, which is a continuation of application No. 07/848,937, Mar. 10, 1992, abandoned.

[51] Int. Cl.$^7$ .................................................. G06F 19/00
[52] U.S. Cl. .................................... 700/163; 700/195
[58] Field of Search ................................ 318/569, 570; 29/563, 564, 564.1, 564.2, 407; 700/163, 187, 192, 195; 702/33

[56] References Cited

U.S. PATENT DOCUMENTS

| | | | |
|---|---|---|---|
| 1,336,311 | 4/1920 | Martin | 408/116 |
| 1,867,367 | 7/1932 | Marlin | 73/149 |
| 2,025,020 | 12/1935 | Russell et al. | 29/156.4 R |
| 2,249,121 | 7/1941 | Drescher | 356/392 |
| 2,270,505 | 1/1942 | Burleson | 33/542 |
| 2,303,651 | 12/1942 | Mason | 408/116 |
| 2,454,959 | 11/1948 | Barnes | 350/23 |
| 2,614,368 | 10/1952 | Polk et al. | 356/392 |
| 2,716,340 | 8/1955 | Nance et al. | 73/149 |
| 2,833,264 | 5/1958 | Dailey et al. | 29/156.5 R |
| 2,944,336 | 7/1960 | Stancliff et al. | 29/156.4 R |
| 2,994,962 | 8/1961 | Lebourg | 356/373 |
| 3,052,960 | 9/1962 | Burrell | 29/156.4 R |
| 3,120,861 | 2/1964 | Finlay et al. | 83/365 |
| 3,160,070 | 12/1964 | Lobash et al. | 409/195 |
| 3,354,319 | 11/1967 | Loewen et al. | 250/237 R |
| 3,391,501 | 7/1968 | Boettcher | 83/365 |
| 3,520,607 | 7/1970 | Zoot | 356/376 |
| 3,599,004 | 8/1971 | Grendelmeier | 250/237 G |
| 3,619,617 | 11/1971 | Kolb | 51/165.72 |
| 3,666,885 | 5/1972 | Hemsley | 356/23 |
| 3,679,307 | 7/1972 | Zoot et al. | 354/4 |
| 3,723,003 | 3/1973 | Vockenhuber | 356/4 |
| 3,796,492 | 3/1974 | Cullen et al. | 356/1 |
| 3,835,591 | 9/1974 | Cimprich | 51/165.72 |
| 3,840,301 | 10/1974 | Pryor et al. | 356/354 |
| 3,885,483 | 5/1975 | Ikeya et al. | 83/365 |
| 3,886,356 | 5/1975 | Gomm et al. | 250/223 B |
| 3,894,802 | 7/1975 | Huggins | 356/376 |
| 3,973,119 | 8/1976 | Renes et al. | 356/396 |

(List continued on next page.)

FOREIGN PATENT DOCUMENTS

| | | | |
|---|---|---|---|
| 0728860 | 3/1966 | Canada | 356/1 |
| 608505 | 1/1935 | Germany | 356/396 |
| 2700713 | 7/1978 | Germany | 51/165.72 |
| 2847452 | 5/1980 | Germany | 409/133 |
| 549319 | 12/1975 | U.S.S.R. | 409/188 |
| 629040 | 9/1978 | U.S.S.R. | 409/149 |
| 1279411 | 6/1972 | United Kingdom | 408/2 |

OTHER PUBLICATIONS

WO 79/00189; Apr. 19, 1979; 356–1.
Pryor et al "Laser Based Gauging/Inspection" Electro–Optical System Design vol. 7, pp. 26–31, Copy in 356/372 (no date).

*Primary Examiner*—Paul P. Gordon
*Attorney, Agent, or Firm*—Larson & Taylor, PLC

[57] ABSTRACT

A method and apparatus measures cylinder head combustion chambers and provides inputs to machines which can perform operations to assure that all combustion chambers are at a correct volume. Also disclosed are devices for matching volumes of engine assemblies as well as precise machining of gears, turbine blades and other parts. Measurements are ideally made via electro-optical sensors, particularly triangulating types.

9 Claims, 3 Drawing Sheets

U.S. PATENT DOCUMENTS

| | | | |
|---|---|---|---|
| 3,983,376 | 9/1976 | Pozzetti | 408/116 |
| 3,986,013 | 10/1976 | Brunette et al. | 364/568 |
| 3,994,583 | 11/1976 | Hutchins | 356/28 |
| 4,001,980 | 1/1977 | Wallin | 51/165.72 |
| 4,004,852 | 1/1977 | Pentecost | 356/4 |
| 4,040,738 | 8/1977 | Wagner | 356/4 |
| 4,051,483 | 9/1977 | Suzuki | 356/376 |
| 4,073,247 | 2/1978 | Cunningham et al. | 364/474.34 |
| 4,114,349 | 9/1978 | Jensen et al. | 53/54 |
| 4,125,317 | 11/1978 | Gordon et al. | 356/376 |
| 4,146,327 | 3/1979 | Harris | 356/1 |
| 4,149,089 | 4/1979 | Idelsohn et al. | 250/563 |
| 4,158,507 | 6/1979 | Himmel | 356/376 |
| 4,167,082 | 9/1979 | Kolb | 51/165.72 |
| 4,168,437 | 9/1979 | Nihonmatsu | 356/1 |
| 4,171,917 | 10/1979 | Pirlet | 356/376 |
| 4,178,820 | 12/1979 | Gerber | 83/13 |
| 4,180,329 | 12/1979 | Hildebrand | 356/23 |
| 4,185,672 | 1/1980 | Vit et al. | 144/312 |
| 4,188,544 | 2/1980 | Chasson | 250/560 |
| 4,190,767 | 2/1980 | Crouse | 250/231 SE |
| 4,248,532 | 2/1981 | Nosler | 356/1 |
| 4,305,661 | 12/1981 | Pryor et al. | 356/241 |
| 4,373,804 | 2/1983 | Pryor et al. | 356/376 |
| 4,396,836 | 8/1983 | Vitaliani et al. | 356/376 |
| 4,403,860 | 9/1983 | Pryor | 356/375 |
| 4,430,891 | 2/1984 | Holm | 73/149 |
| 4,448,065 | 5/1984 | Meurer | 73/149 |
| 4,559,684 | 12/1985 | Pryor | 356/376 |
| 5,012,574 | 5/1991 | Pryor | 356/376 |
| 5,112,131 | 5/1992 | Pryor | 356/376 |
| 5,280,179 | 1/1994 | Pryor et al. | 250/561 |

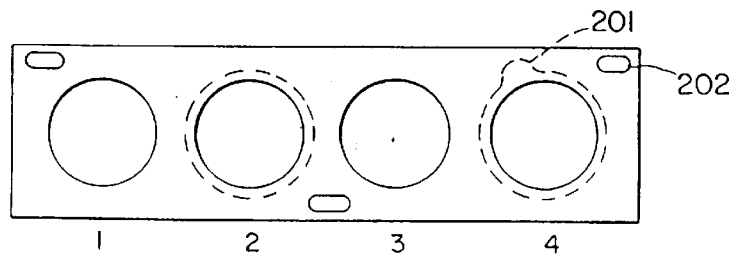
FIG. 3A
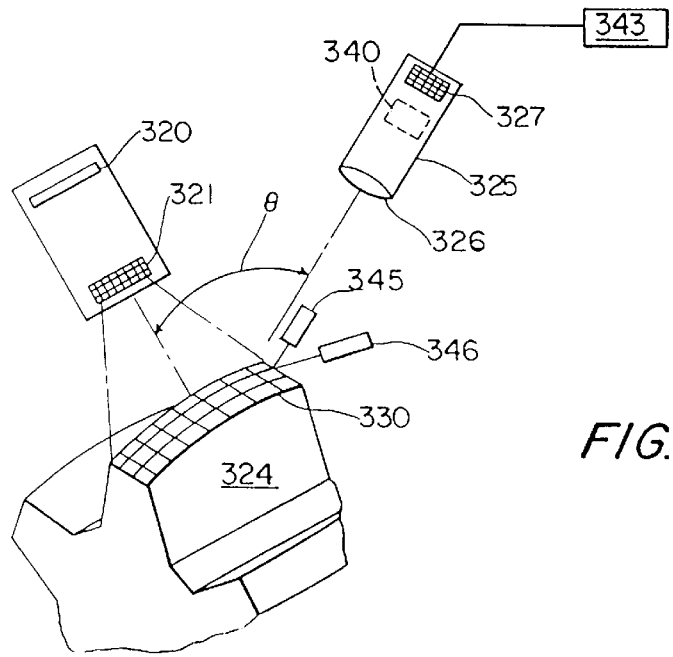
FIG. 3B
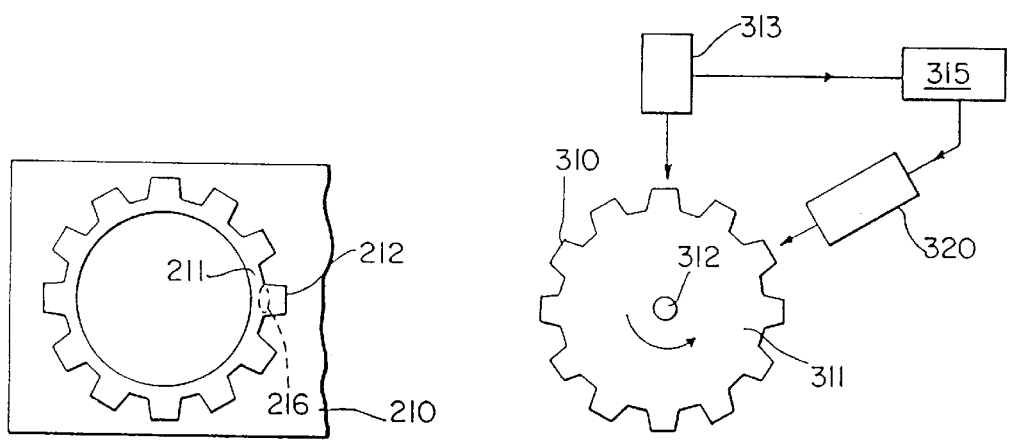
FIG. 4
FIG. 5

CONTROLLED MACHINING OF COMBUSTION CHAMBERS, GEARS AND OTHER SURFACES

This application is a continuation of application Ser. No. 07/509,295, filed Apr. 16, 1990, now U.S. Pat. No. 5,112,131, which was a continuation of application Ser. No. 07/042,527, filed Apr. 27, 1987, now U.S. Pat. No. 5,012,574, which was a continuation of application Ser. No. 06/767,374, filed Aug. 20, 1985, now abandoned on Apr. 27, 1987, which was a continuation of application Ser. No. 06/560,259, filed Dec. 12, 1983, now U.S. Pat. No. 4,559,684, which was a continuation of application Ser. No. 06/238,702, filed Feb. 21, 1981, now abandoned on Dec. 12, 1983.

This application is a continuation of application Ser. No. 07/848,937 filed Mar. 10, 1992, now abandoned on Dec. 2, 1993.

BACKGROUND OF THE INVENTION

A significant (ie. 2%) fuel economy and/or emissions improvement can be obtained in multi-cylinder internal combustion (IC)engines if the fuel mixture is accurately balanced in all cylinders. This requires close control of combustion chamber volume, a difficult proposition using standard manufacturing techniques. This invention describes means for doing so using optical sensing and feedback to machining operations. Applications also exist to the more controlled manufacture of gears and other contoured surfaces.

Techniques according to the invention to produce better combustion chamber matching are:

A) Mill or otherwise machine bank face of cylinder head to optimally suit head casting.

B) Do 'A' and/or also trim each chamber to size, for example, by removing or adding additional material in certain areas, or controlling the machining of valve seat height, according to measured volume data.

C) Finish machine chambers in cylinder head to match displaced volume of pistons in finished engine.

All of the above depend on rapid, on-line, accurate measurement of combustion chamber shape and volume, (and in 'C', piston domes and height relative to bank face of block ie. "deck height"). This can only be done optically in any practical manner. Previous means to determine volume via displaced water, sound waves and the like are totally unsuited to modern automatic production.

A typical optical sensor of the triangulation type capable of doing the required dimensional measurement is shown in copending application of Pryor et al, Ser. No. 34,278, now U.S. Pat. No. 4,373,804, issued Feb. 7, 1983, filed Apr. 30, 1979, the disclosure of which is herein incorporated by reference. Alternately, a multi-contact optical sensor can be used, derived from those shown in another copending application of Pryor, Ser. No. 134,465, filed Mar. 27, 1981, the disclosure of which is herein incorporated by reference.

While most applications of the invention envision material removal to attain proper dimensions, it is possible as well to add material. One example would be to use a valve whose head displaces more volume, if the volume in that chamber was excessive.

An alternative technique disclosed is to measure the chamber volumes and input this data to fuel system controls to vary the mixture into each cylinder according to its individual volume. This adjustment of the fuel system according to volume is most practical where individual fuel injection is utilized for each cylinder.

A related idea relative to gears is to measure gear teeth contours and cut them to print size, or to provide a Match to characteristics of another gear already measured, to prove quieter operation and other advantages. Other examples of such controlled machining can be controlled forming of turbine blades etc.

Another aspect of the invention is in controlled deburring of parts, wherein optical sensing according to the invention is used to determine presence and size of burrs and actuate a laser or other machining means to remove burrs present exceeding a certain value and/or at a certain position.

Several embodiments of the invention are disclosed:

BRIEF DESCRIPTION OF THE DRAWINGS

FIG. 3A illustrates gasket trim according to the invention.

FIG. 3B illustrates an optional type of gasket according to the invention.

FIG. 4 illustrates optimum gear machining according to the invention.

FIG. 5 illustrates optical measuring for gear teeth.

DETAILED DESCRIPTION OF THE INVENTION

Figure 1:
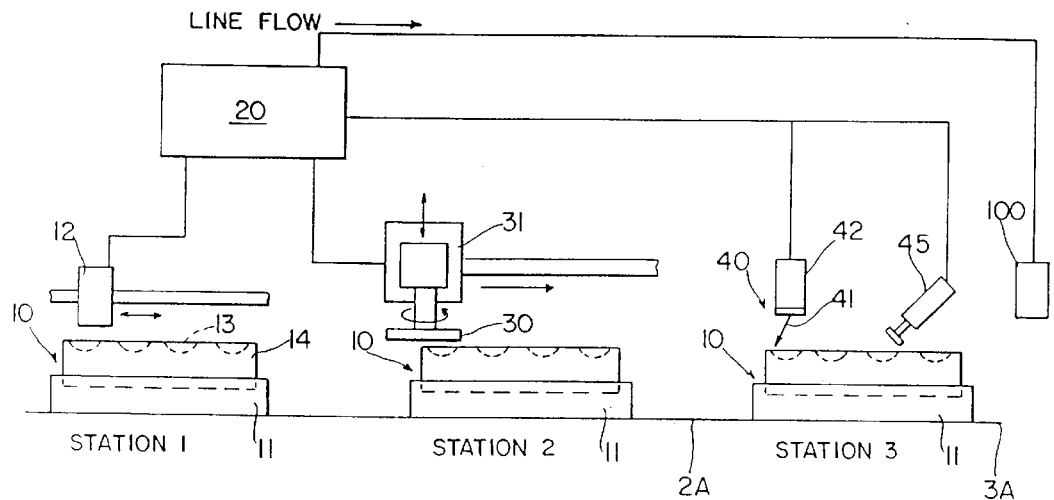
FIG. 1 illustrates a machine for optimally facing and trimming cylinder head castings.

Illustrated in FIG. 1 is an application of the invention according to concepts A and B above. A machine to mill the bank face and/or chambers of raw cast cylinder heads is provided according to the invention, having the following stations:

Station 1:

Here the incoming cylinder head casting 10 is clamped on pallets 11 with locators (not shown). Sensor unit 12 optically measures combustion chamber face 13 of cylinder head casting for flatness and depth and shape of chambers (eg. 14) plus. volume, with respect to design and to each other. This data is inputted to computer 20 for analysis.

Station 2:

At this station a controlled face milling is performed by mill 30 with vertical control 31 to machine the head face with a plane determined such-that sizes of all chambers are most evenly matched. This is optimumly determined via computer program. In general some chambers will be smaller, some larger than nominal volume.

Station 3: Matching Station

For most precise volumetric control, the chambers are machined to match in this station. This station can be in addition to or in place of the station mentioned above. Chambers with the smallest volume (ie. most material) are micro machined down in selected locations (which according to the invention may be specially put into the head casting for the purpose) to make all chambers equal.

Alternatively, the valve seat machining operation can be performed to locate seats deeper into the head (and therefore increase volume) when a nominal valve size is inserted on those-heads having smaller than nominal volumes. Indeed, a combination of both machining methods can be used. The valve seat method is easiest since the machining has to be done anyway, but large volume changes may not be possible using this approach alone if problem with valve train assembly or operation result.

A trim operation is shown, utilizing computer 20 driving a galvo mirror scanner 40 which directs high power laser beam 41 from laser 42 to trim the head at the points desired. Alternatively, a small mill or grinder 45 controlled by comiputer20 can also be used.

Optional stations 2A and 3A are supplementary optical inspection stations, like station 1, to check volumes and feedback correction data if any for the next machining cycle. Use of these stations assures that the process is in control and further provides a verification of final volumes for quality control purposes.

Optionally too, an ink jet, laser marker, or other suitable printer 100, can be used to mark volumes (obtained from measurements performed in stations 1, 2A or 3A as applicable in alpha-numeric or coded form on the side of the head. Such codes can be read manually or automatically at further stations to allow further matching of pistons with the head chambers if desired. This would be desirable especially if station III was omitted, ie. if all chambers were close to nominal size, but not equal, and said equalization could be achieved by proper piston or rod choice, or by selectable machining of the piston.

The above procedure for head machining is a giant step forward in providing matched chambers of exact size. However, no matter how good the head is, the final engine cylinder volume is also a function of piston height, dome shape, conrod length, and crank throw, all relative to the engine block face or "deck".

To provide therefore for total matching capability, two procedures can be used:

1) Measure the piston height and shape and match pistons to the chambers before assembly. This assumes good control of rods, crank and deck distance (also called "bump height") to crank journals. Matching can be done by machining the piston dome or cylinder head chambers. (In diesels with flat heads, only the dome can be so altered.)

2) In the final assembly, actually measure the piston in its top dead center position relative to the deck, and finish the trim piston or combustion chambers accordingly on the assembly line. Illustration of this. latter example will now illustrate both techniques.

Figure 2:
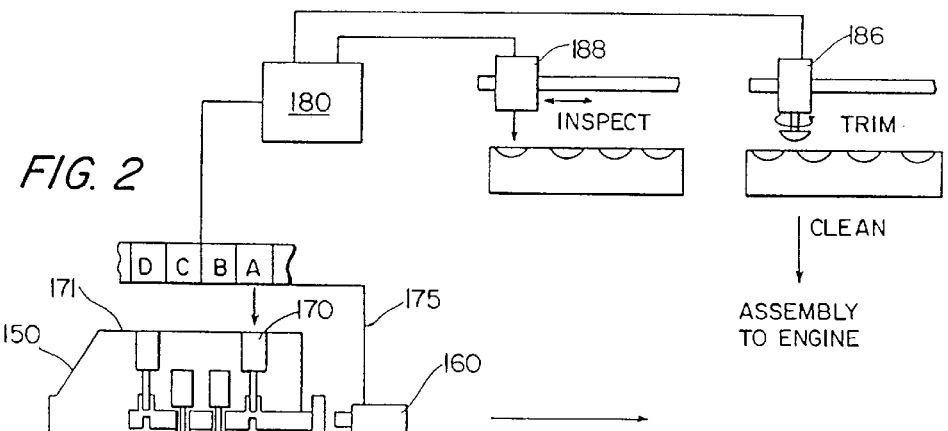
FIG. 2 illustrates a combustion chamber trim operation utilizing measured volume data from engine block assemblies. Also illustrated is an adjustment of fuel system.

FIG. 2 illustrates an engine assembly line operation wherein an assembled short block 150 is brought into position, and the following steps occur:

1) Motor, 160, cranks engine over
2) As each piston, eg. 170, reaches top dead center, the appropriate sensor unit (A, B, C or D) checks its height, above or below the deck or bank face of the block 171. Also a check may be at bottom dead center if stroke can vary appreciably. Generally, however, the problem is the block or piston dome:, since crank and rod dimensions are relatively well controlled. A trigger 175 from the crank rotation is used optionally to fire the sensor unit which also can determine errors in phasing of pistons with crank timing pickoff.
3) Piston height data relative to the deck, "h") is fed to computer 180 and then to trim mill, grinder, laser, or other machine 186 which trims each combustion chamber of the head to match the measured piston data (which in extreme cases can include piston dome shape as well as. height). The net result is that the volume of all chambers is equal and correct.

This trim operation effectively replaces that of the machine of FIG. 1 (station III). If such a machine is not used or if data is not available from FIG. 1 machine via marked code or computer transmittal, the head is inspected by sensor unit 188 for shape and volume before machining.

It is noted that machining can be best done if one seeks only to match the chambers, not match all to a specific narrow size band which would be even more desirable. However, if one notes the volume attained, one can sometimes calibrate the rest of the fuel and/or electrical system for this value.

Figure 2A:
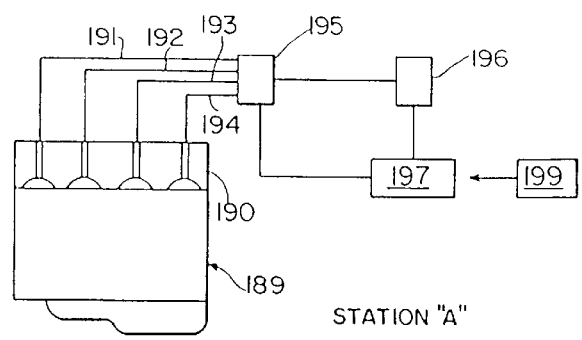
FIG. 2A illustrates a variation of the operation illustrated in FIG. 2.

FIG. 2A illustrates another technique of the invention for controlling engine performance. As shown, a finished engine 189 is equipped with head 190 which includes separate fuel injection circuits 191–194 for each of the 4 cylinders of the is engine. Each fuel injector circuit is attached to distribution unit 195 and pump 196. Each is controlled by microcomputer 197.

The invention here is that the absolute amount and/or relative relationship (amount, duration, timing etc.) of fuel injected into each of the 4 cylinders is determined by the microcomputer (or other means) in accordance with volumes and/or chamber profiles determined in the measurement process shown in FIG. 2 above. Appropriate values for the engine in question are inputed by input means 199 at a point further down the line (ie. station "n"). In this case, one does not necessarily have to make each chamber nearly identical, but rather vary the mixture according to what it is measured to be. Naturally, one can also do some of both. Also one can vary other variables (flow, spark timing etc.) rather than fuel.

Another aspect of the invention relative to FIGS. 1 and 2, is that one can add material to the head or piston as a result of the measurement, as well as remove it. In this same vein, one can select certain parts to cause volumes to be changed. This has been discussed relative to pistons and rods, bust also can be done with valves (having different head thickness or diameter) and head gaskets.

Similarly, one can also machine the valve heads or head gaskets before assembly. For example, small increases in volume can easily be made by triming the head gasket with a high speed laser beam such as 41 (an ideal machining operation, perfectly suited to a computer controlled beam). For example, in FIG. 3A, the gasket area corresponding to chambers 2 and 4 have been trimmed (dotted lines) by varying amounts to compensate those chambers. Naturally only a little change can be accomplished in this manner since one can not trim in areas which would cause leakage, and some gaskets are but a few thousandths of an inch thick. However, it is considered within the purview of this invention to use thicker gaskets and/or with gasket material removed selectably from different zones (for example 201 in FIG. 3A). For example, had cylinder 4 been trimmed uniformally in a concentric ring it would have come too close to water passage 202.

Gasket design can even reflect this procedure. Consider FIG. 3B wherein a gasket 210 has seal ridge 211 as in certain normal gaskets. However, it also has scalloped inner seal ridge 212. To increase volume of the chamber, one merely cuts one or more sections of the seal ridge 211 such as 216, according to the measurements made to expose one or more additional scallop volumes.

Another possibility is to trim machine the valve heads on the zone toward the combustion chamber. However, this can alter the dynamics of the valve train if too much is taken off. It is however easy to selectively insert valves of different volumes on command—indeed this could be automated.

Any or all of the above techniques can be used singularly or in combination to produce engines of correct volume.

It is further noted that all of these techniques operated in reverse serve to provide a means to purposely mismatched volumes of chambers. This might have some point if induction favored certain cylinders over others.

A key item is that the sensor(s) used must be fast and accurate (ie. 25 micron accuracy or better), to obtain a sufficient number of data points on all chambers within line cycle time (typically 30 sec. or less). Also the height sensors should be able to operate "on-the-fly" such that precise positioning of the crank at each location is not required. Such a sensor is best of the optical triangulation type, and three kinds of triangulation sensor approaches are described-below (relative to FIG. 5, 6 and 7).

While triangulation is preferred, it is not the only possible electro-optical type (although triangulation or CO2 laser interferometry is virtually the only non-contact optical way). One can also use a grid projection form of triangulation to contour each chamber (see FIG. 5).

Less desirably, a nest of contact type probes such as LVDT's etc. can also be used. However, if contact type sensing is desired, the new optical contact gage described in my copending application Ser. No. 134,465, now U.S. Pat. No. 4,403,860, issued on Sep. 13, 1983 is ideal, since a large number of points can be economically and accurately measured.

FIG. 4 illustrates an application of the invention to gear manufacture. Contours of gear teeth 310 of a gear 311 rotated about its axis 312 are inspected by optical sensor unit 313. Shaft angle encoder (not shown) is used to provide rotational position information. Computer 315 is used to determine the running characteristics of this gear and the machining steps needed to optimize it to a particular norm or a previously measured gear with which it is to be matched.

Computer 315 then drives programmable machine tool such as laser 320 to machine the gear to the correct value. Each tooth or only a few teeth can be machined, ideally at a different station from where the measurement occurs.

This procedure can be done with rough machined "green" gears, or after typical finished gear production such as by hobbing, broaching, shaping etc. In this latter case, the process can operate in at least two ways:
1. The computer 315 directly controls the grinder, hob, shaper, etc.
2. The gears are pre hobbed etc. to some maximum material condition and a laser or other micro machining technique is used to fine trim them to exact size.
3. Obviously a combination of the above is possible as well.

FIG. 5 illustrates a "grid" type triangulation system suitable for measuring the rotating gear teeth of FIG. 4, or the combustion chambers or piston domes of FIG. 1. Using a flashed source 320, line grid 321 is projected on the gear tooth 324. Two axis sensor unit 325 comprised by lens 326 and matrix photo detector array 327 analyzes the image of the grid lines 320 viewed from an included angle θ. Grid image contour can be related to tooth shape using known geometric equations. The flashed source is used to project the grid instantaneously, "freezing" part motion.

To reduce dynamic data processing requirements a Moire type system can be used employing sorted grid image 340 located at or near the face of detector array 327. The grid image 340 represents the contour grid image of a perfect tooth and spatially filters the image of the test tooth image 330, providing only a difference pattern to be analyzed by analysis means represented by microcomputer 343.

To do this, very good registration is required, assured in this case by source 345 and receiver 346 operating on the optical triangulation principle from the gear pitch line. When the pitch line is detected, the grid flash source 320 is fired.

This same Moire approach can also be used on the cylinder heads. It is noted that very fine grids are required, as can be generated by beating laser beams together.

Figure 6:
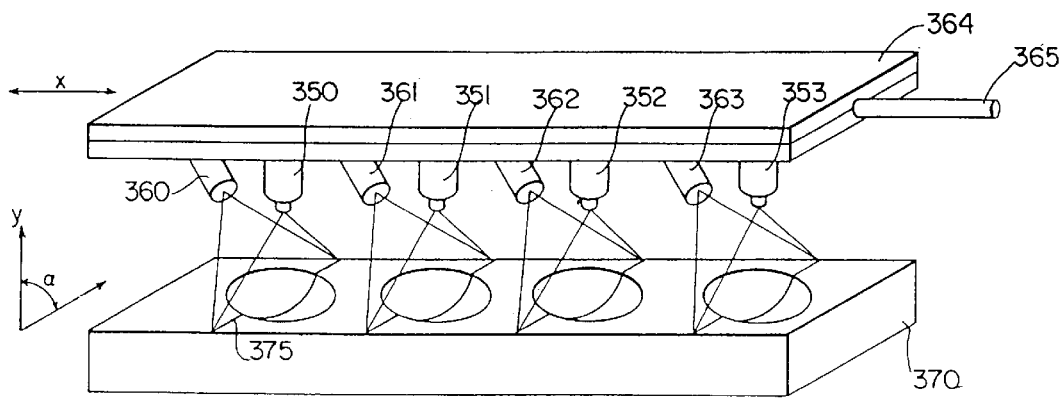
FIG. 6 illustrates a means for scanning cylinder head combustion chambers.

FIG. 6 shows a line type triangulation sensor version having four line projection sources 350, 351, 352, 353 and four matrix array sensor units 360, 361, 362, 363 (each similar to 325) all moved together on a common plate 364 by motor 365 to provide successive sections of all 4 combustion chambers of cylinder head 370. (Alternatively, the head can be moved relative to the sensors for example on a continuous conveyor.)

Single point sensing triangulation units as described in the copending application can also be used if z axis scan movements as well as x axis scans are used. A discrete number of point sensors, for example ten arrayed in the z direction, can also be used. When the motor moves the ten points, ten lines are scanned. Here the motor would ideally scan the ten sensor units driven the total length of the head, covering all chambers. Naturally, the more points, the better the volume determination. Naturally a complete two axis grid of triangulation point detectors can also be used.

Figure 7:
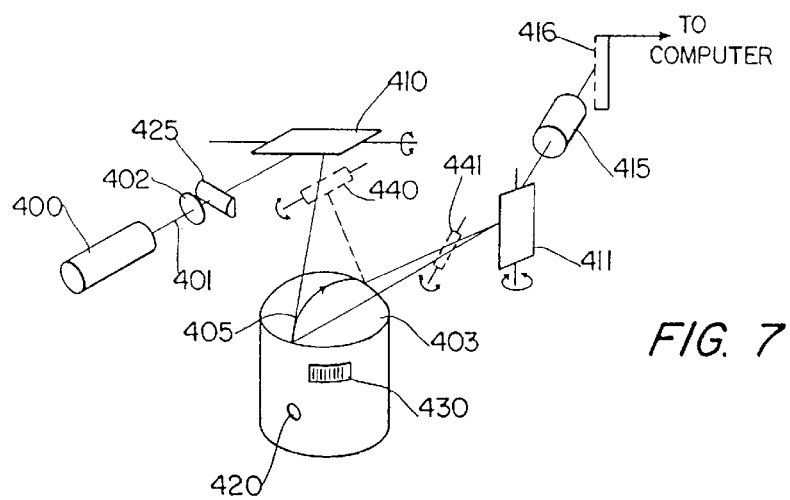
FIG. 7 illustrates electro-optical means for contouring pistons.

FIG. 7 illustrates a final triangulation version suitable for fast high range accurate measurement. Laser 400 projects a beam 401 which is focused by lens 402 onto piston dome 403 to form a spot 405. Rotating galvo mirror 410 sweeps the spot across the dome. Galvo mirror 411 tracks the spot such that lens 415 can always keep the spo't imaged onto large linear diode-array 416, for example a Reticon 1728C.

Signal processing to find piston dome contour (and displaced. volume from the reference point of the pin bore 420), is described in copending applications Ser. No. 34,278, now U.S. Pat. No. 4,373,804, issued Feb. 17, 1983, and Ser. No. 163,290, now U.S. Pat. No. 4,394,583, issued on Jul. 19, 1983, the disclosures of which are hereby incorporated by reference. To keep tracking requirements of mirror 411 to a minimum, cylindrical optics such as lens 425 (optional), may be used to somewhat expand the spot 405 in the direction of scan (such that even with tracking error some portion of the elongated spot lands on the detector array).

As with FIG. 6, movement of this unit across the piston in the x direction sweeps out the total dome contour.

For illustration, a bar code 430 is shown printed on the piston (ideally on the dome itself). This code can be read out at the assembly operation, shown in FIG. 2, such that both deck height and contour are known, without sophisticated measurements at the assembly line. Naturally this information can be used to trim heads, gaskets etc., selectively assemble components such is valves or spark plugs or for that matter trim the piston dome to a given contour at the piston machining line.

Speaking of spark plugs, these too can be assembled into the engine according to chamber volume. This is an attractive approach since nothing changes the existing lines, only the addition of measurement equipment. The head or block would be marked with volume related data, and the plugs chosen at the plug assembly operation (after the FIG. 2 operation) according to volume. For example, a cylinder with too much volume would receive a plug with a longer threaded portion (ie. penetrate deeper). Unfortunately combustion characteristics could be considerably altered so only small volume variations can be accounted for this way.

While primarily aimed at high resolution acquisition of data along a line of surface points, the invention can also be used to contour the whole piston dome (or other surface), without proving the sensor. In this case, additional scan mirror 440 is aded to sweep in the X direction, with additional receiving or tracking mirror 441 used as well to provide tracking in this axis as well. Accuracy however is not as great since it is harder to optimize reflective power levels. Also data in the x axis must be obtained using a two dimensional array and/or by measuring mirror position both axes, rather than just one.

Note that this arrangement can be used with a strip of light projected simultaneously on the part as in FIG. 3, with no tracking required.

Figure 8:
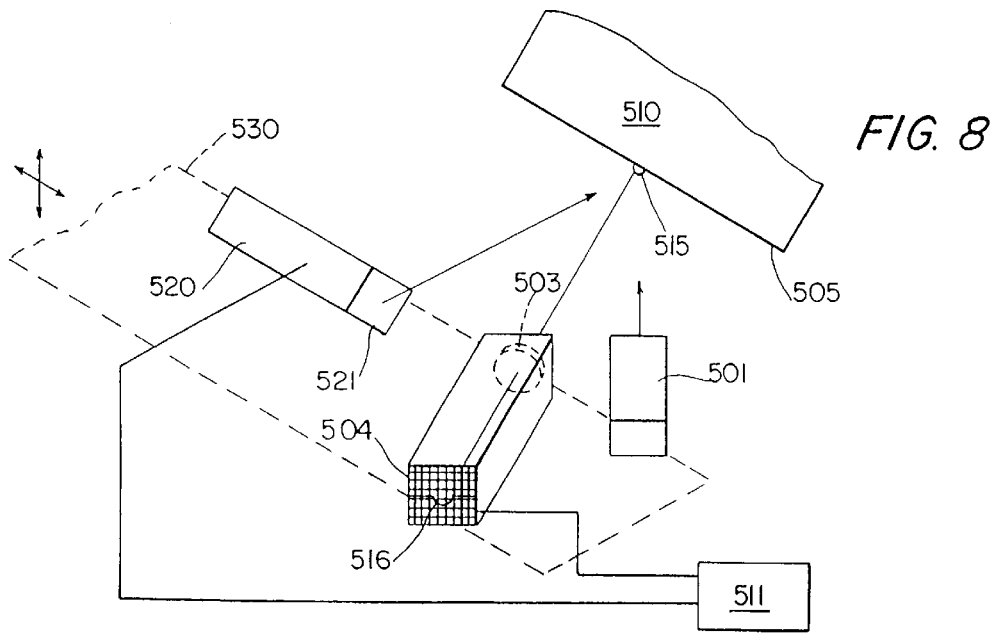
FIG. 8 illustrates a controlled laser deburing operation according to the invention.

FIG. 8 illustrates a final embodiment of the invention useful for controlled removal of burrs. In this case, sensor unit 500 comprised of light source 501, lens 503 and matrix photo-detector 504 is used to image the edge 505 of a part, in this case an aircraft/ft wing panel 510 to determine via microcomputer 511 the presence location,649 and size of any burrs such as 515 on the edge.

If a burr is detected as in image 516, laser 520, whose beam is directed via galvo mirror system 521 controlled by microcomputer 511, or other machine removes or reduces it in size (to within acceptable limits) under control of the microcomputer and the operation proceeds to a new view location. Alternatively all such burrs can be memorized as to position and the removal. process performed later.

The sensor and machine unit may be desirable located on a robot such as 530 and moved to various locations on a large panel. Alternatively, for small parts the part may be moved.

Where few burrs exist, this technique can save considerable energy since only those portions of the edge which are objectable are worked. The process is also fast and can be combined with inspection tasks carried out by the same or different sensors.

Note that the words "opt.ical" and "light" used in this disclosure apply not only to visible wavelenghs of electro magnetic radiation, but all wavelengths X-ray through infra red. Visible or near infra red (to 10 microns) sources are however preferred.

What is claimed is:

1. A method of manufacturing parts comprising:
   a) shaping, by using shaping means, the contour of the surface of a part located in a part-shaping location to provide a shaped part;
   b) rapidly, accurately, and on-line, electro-optically determining, from a plurality of points on a surface of said shaped part, the contour of said surface of said shaped part;
   c) utilizing the electro-optically determined contour of said shaped part to control said shaping means to shape, by carrying out step a), the contour of the surface of a further part located in said part shaping location to provide a further shaped part; and
   d) repeating steps b) and c) sequentially for each shaped part.

2. A method according to claim 1, wherein said electro-optically determined contour is a three dimensional contour.

3. A method of efficiently selecting a first part for operative interaction with a further part, said first part and said further part being intended to operatively interact with one another in a predetermined manner after selection, the method comprising:
   a) rapidly, accurately, and on-line, electro-optically determining, from a plurality of points on a surface of said first part, the contour of said surface of said first part; and
   b) utilizing the electro-optically determined contour of said first part, selecting from among a plurality of further parts, all of which are designed to operatively interact with said first part in said pre-determined manner, a particular one of said further parts which will efficiently interact with said first part.

4. A method according to claim 3, wherein said electro-optically determined contour is a three dimensional contour.

5. A method of shaping a second part for operative interaction with a first part, said first part and said second part being intended to operatively interact with one another in a predetermined manner after said shaping, the method comprising:
   a) rapidly, accurately, and on-line, electro-optically determining, from a plurality of points on a surface of said first part, the contour of said surface of said first part; and
   b) utilizing the electro-optically determined contour of said first part, shaping said second part for efficient operative interaction with said first part in said predetermined manner.

6. A method according to claim 5 further comprising, before step b), utilizing the electro-optically determined contour of said part, selecting from among a plurality of further parts all of which are designed to operatively interact with said first part in said pre-determined manner, a particular one of said further parts.

7. A method according to claim 5, wherein said electro-optically determined contour is a three dimensional contour.

8. A method of rapidly, accurately, and online assembly of parts which are intended to operatively interact with one another in a predetermined manner in an assembled object, the method comprising:

rapidly, accurately, and on-line, electro-optically determining the contour of said surface of a first part;

assembling said first part with a second part designed to operatively interact with said first part in a predetermined manner in an assembled object, said second part being adjustable to affect its operative interaction with said first part; and, utilizing said determined contour of said surface of said first part, adjusting the second part to optimize its interaction with said first part.

9. A method according to claim 8, wherein said electro-optically determined contour is a three dimensional contour.

* * * * *